United States Patent
Ueda

(10) Patent No.: US 6,285,523 B1
(45) Date of Patent: Sep. 4, 2001

(54) TAPE CARTRIDGE CONTAINING TAPE SUPPLY AND TAKE-UP REELS, RECORDING DRUM AND REEL DRIVE MOTORS, OBVIATING CAPSTAN MOTOR

(75) Inventor: Hitoshi Ueda, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/339,686

(22) Filed: Jun. 24, 1999

(30) Foreign Application Priority Data

Jun. 26, 1998 (JP) .................................................. 10-180055

(51) Int. Cl.⁷ .................................................. G11B 5/027
(52) U.S. Cl. .......................................... 360/85; 360/73.09
(58) Field of Search ............... 360/82, 132, 73.09–73.14

(56) References Cited

U.S. PATENT DOCUMENTS 3,510,605   5/1970  Ottens .
5,274,506  12/1993  Hashimoto et al. .
5,986,848 * 11/1999  Kobayashi ............................. 360/85

FOREIGN PATENT DOCUMENTS 0 229 996   7/1987  (EP) .
0 697 698   2/1996  (EP) .
0 768 667   4/1997  (EP) .
0 827 150   3/1998  (EP) .
0 955 637  11/1999  (EP) .

* cited by examiner

*Primary Examiner*—A. J. Heinz
(74) *Attorney, Agent, or Firm*—Frommer Lawrence & Haug LLP; William S. Frommer

(57) ABSTRACT

A small-sized light-weight tape cartridge to be installed in a recording and reproducing apparatus, for stably controlling a predetermined running speed of the tape. A clock signal is calculated from the photo-detected rotation of a reel in the cartridge by reading out from a ROM a count value per second corresponding to an accumulated counting value. The rotation speeds of the winding reel and the feeding-out reel in the cartridge are controlled so that the tape speed becomes a prescribed value. As a result, there is no need for a capstan motor, and the tape, a drum, the winding reel, the feeding-out reel and a control driving system are accommodated in a small-sized tape cartridge housing that is removably installed in the recording and reproducing apparatus.

11 Claims, 5 Drawing Sheets

TAPE CARTRIDGE CONTAINING TAPE SUPPLY AND TAKE-UP REELS, RECORDING DRUM AND REEL DRIVE MOTORS, OBVIATING CAPSTAN MOTOR

BACKGROUND OF THE INVENTION

1. Field of the Invention

The present invention relates to a tape cartridge of a recording and reproducing apparatus, which is installed in and used for the recording and reproducing apparatus provided with a reel for carrying out winding and rewinding of a built-in tape and a recording and reproducing system comprised of a tape cartridge and a recording apparatus.

2. Description of the Related Art

In a conventional recording and reproducing apparatus, in order to wind a tape at a time of recording, to feed out the tape at a time of reproducing, and to carry out a fast rotation as well as rewinding, a capstan motor to drive a capstan into rotation on which a tape is wound and a reel motor to drive into rotation a winding reel as well as a feeding-out reel were needed.

A capstan motor previously provided in a recording and reproducing apparatus becomes comparatively large-sized, and a tape run has been directly badly affected by shaking and rotational ununiformity of a capstan shaft due to the large-size of the motor. So, in order to realize a stable rotation without shaft shaking and rotational ununiformity, a compensating mechanism and the like become necessary. Further, the conventional recording and reproducing apparatus needed an extra reel motor and as a result, the whole apparatus became more large-sized, thereby incurring a problem in terms of the manufacturing costs.

SUMMARY OF THE INVENTION

The present invention is implemented in view of the present situation of the tape run mechanism in the above-mentioned recording and reproducing apparatus and its object is to propose a tape cartridge and its recording and reproducing apparatus, in which the tape cartridge is installed in and used for the recording and reproducing apparatus capable of stably running a tape at a predetermined speed with a small-sized, light weighted arrangement and at a low cost.

According to an aspect of the present invention, there is provided a tape cartridge for use in a recording and reproducing apparatus, which comprises:

a housing incorporating therein a tape;

a tape, a drum, and first and second reels which are all incorporated in the housing;

a tape drive mechanism incorporated in the housing and feeding the tape;

a detecting means incorporated in the housing for detecting a rotation of the reel; and a converting means incorporated in the housing for converting a signal concerning a rotation detected by the detecting means into a signal concerning a rotation speed.

According to another aspect of the present invention, there is provided a recording and reproducing system formed of a tape cartridge and a recording apparatus, comprising:

a cartridge formed being formed of;

a housing incorporating therein a tape, a tape, a drum, and first and second reels which are all incorporated in the housing, a tape drive mechanism incorporated in the housing and feeding the tape, a detecting means incorporated in the housing for detecting a rotation of the reel, and a converting means incorporated in the housing for converting a signal concerning a rotation detected by the detecting means into a signal concerning a rotation speed; and a recording and reproducing apparatus using the tape cartridge being formed of;

a tape cartridge accommodation portion for accommodating therein the tape cartridge, a means for electrically connecting to the converting means and the tape drive mechanism in the tape cartridge, a calculation circuit for receiving and accumulating a pulse signal concerning the rotation speed and generating a control pulse signal corresponding to an accumulation value accumulated, the control pulse signal indicating a pulse number at every second, and an output circuit for outputting the control pulse signal to the tape drive mechanism.

DESCRIPTION OF THE PREFERRED EMBODIMENTS

A first embodiment of the present invention will be explained with reference to FIG. 1 to FIG. 4.

Figure 1:
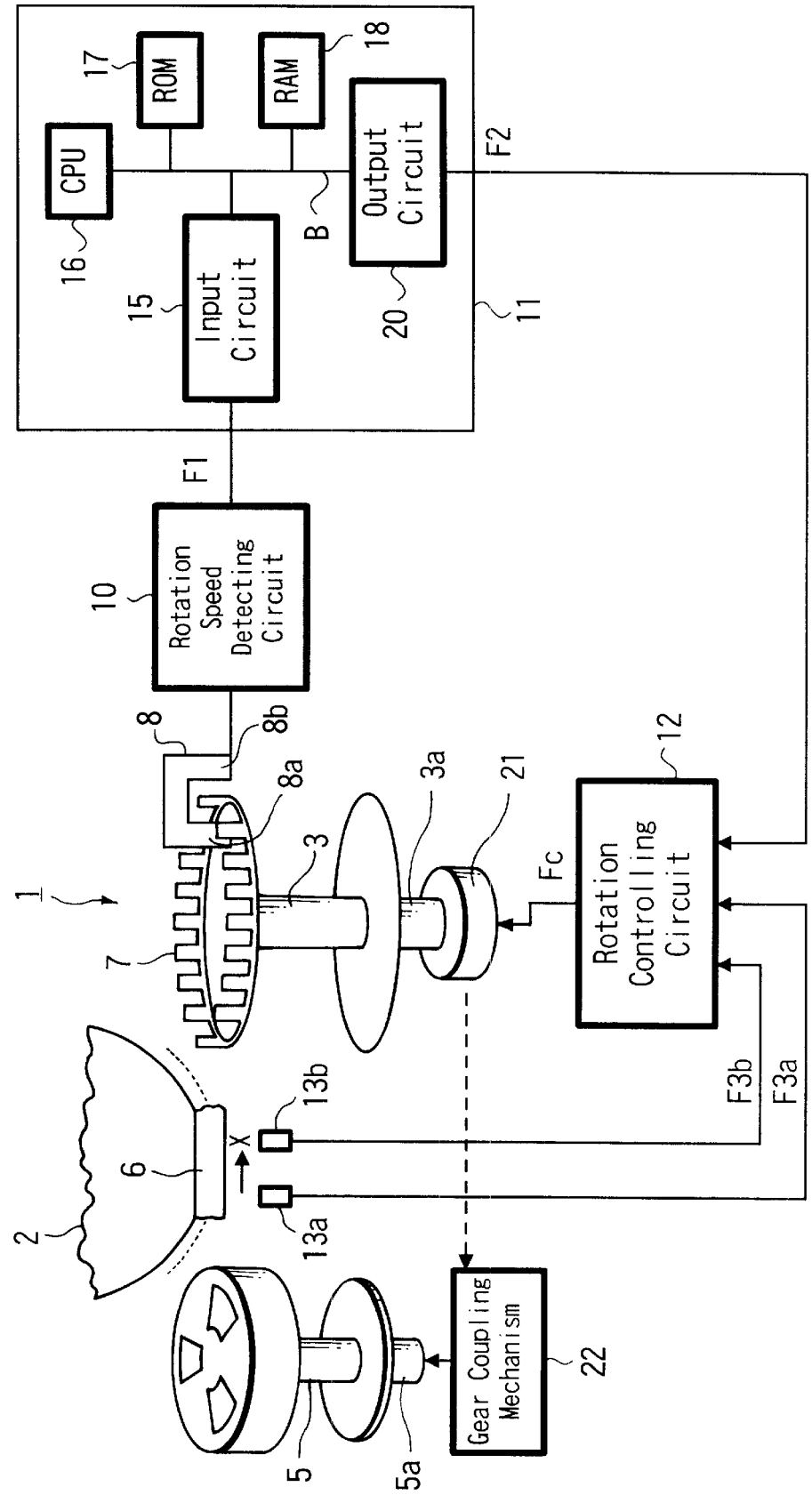
FIG. 1 is an explanatory diagram showing an overall arrangement of a first embodiment of the present invention.
Figure 2:
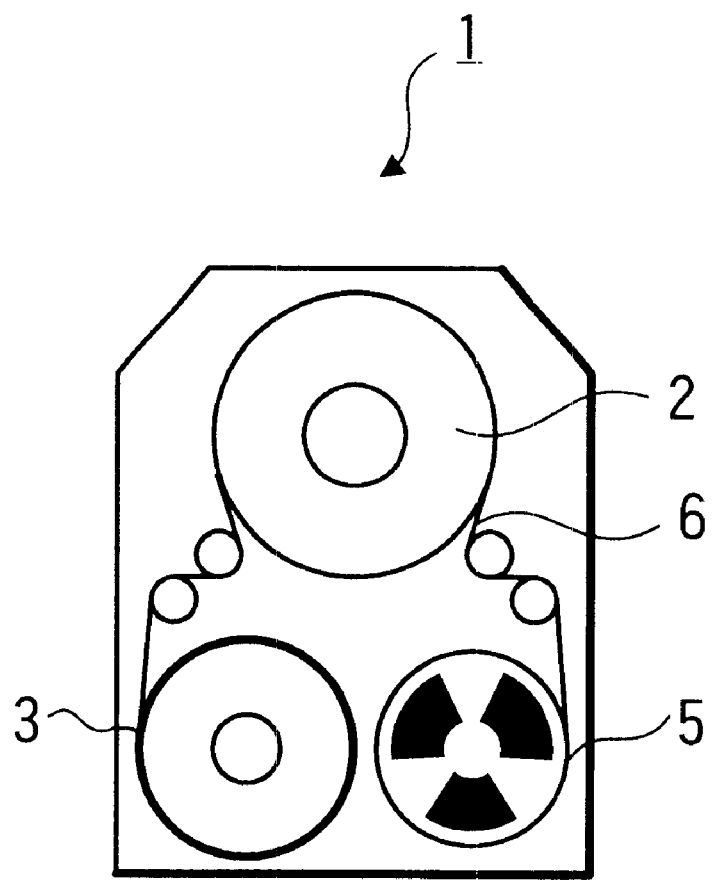
FIG. 2 is an explanatory diagram showing a schematic arrangement of the same embodiment.
Figure 3:
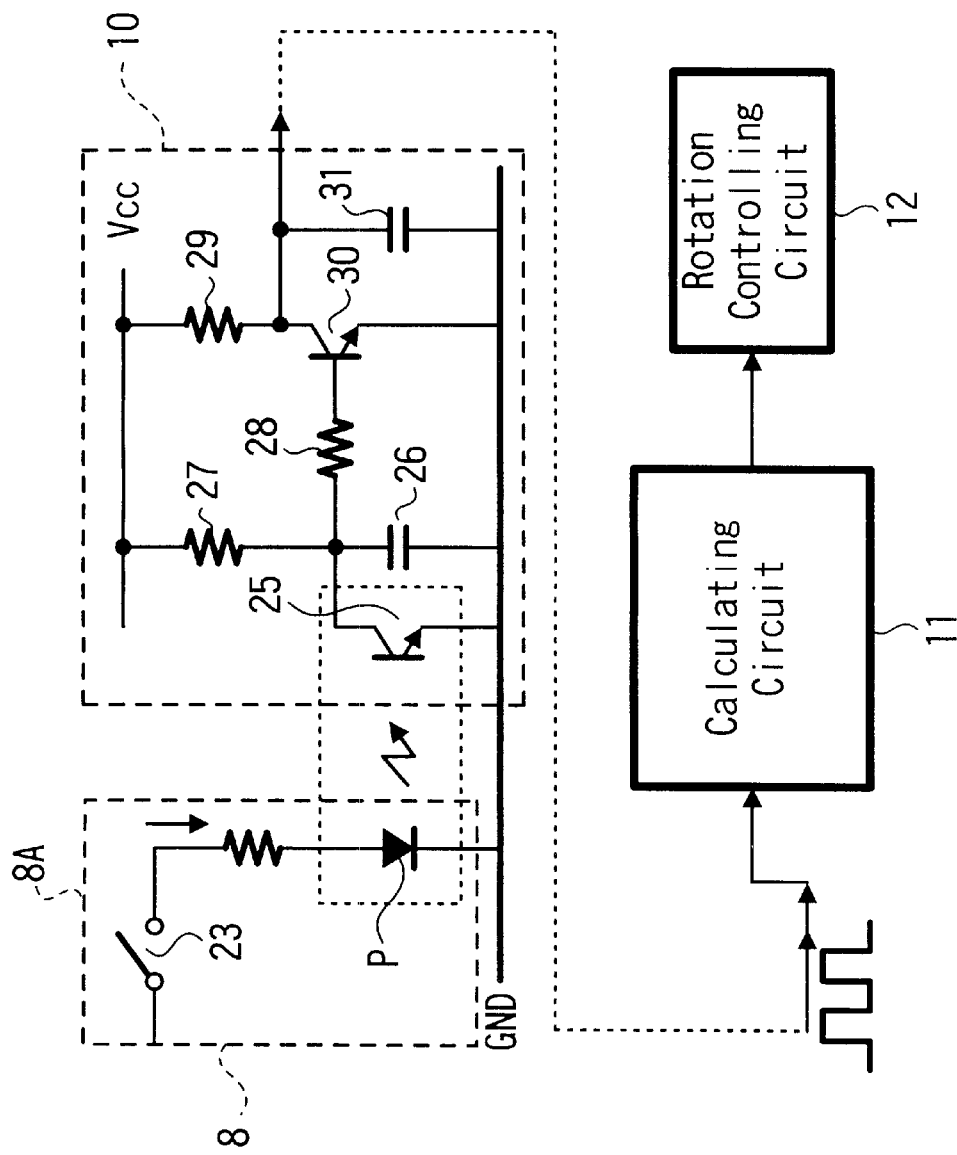
FIG. 3 is a circuit diagram showing an arrangement of an essential portion of a control circuit system in FIG. 1.
Figure 4:
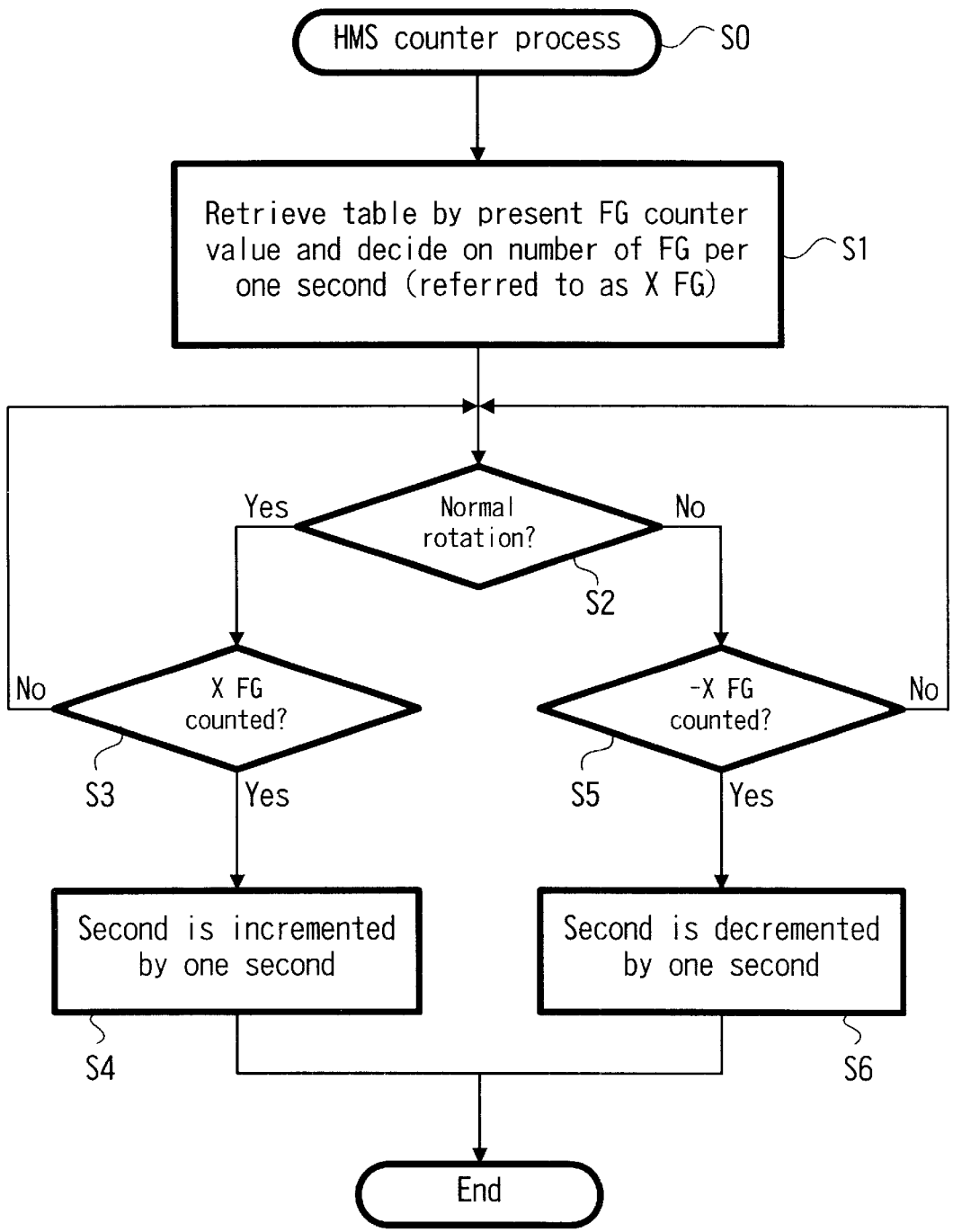
FIG. 4 is a flowchart showing a clock calculating operation of the same embodiment.

FIG. 1 is an explanatory diagram showing an overall arrangement of the embodiment, FIG. 2 is an explanatory diagram showing a schematic arrangement of the embodiment, FIG. 3 is a circuit diagram showing an arrangement of an essential portion of a controlling circuit system in FIG. 1 and FIG. 4 is a flowchart showing a clock calculating operation of the embodiment.

In the embodiment, as shown in FIG. 2, a tape 6, a drum 2 around which the tape 6 is wound, a winding reel 3 and a feeding out reel 5 for winding and feeding out the tape 6 are accommodated in a tape cartridge housing 1. Further, a controlling circuit system as well as a driving mechanism system not graphically shown are accommodated in the tape cartridge housing 1 and the tape cartridge housing 1 is so arranged to be able to be installed in a recording and reproducing apparatus body.

An overall arrangement is, as shown in FIG. 1, such that a comb-shaped photo-interrupter 7 made of light shielding material is provided on an upper edge portion of the winding reel 3, and straddling the photo-interrupter 7, a photo-sensor 8 is provided with its light emitting unit 8a being positioned on the winding reel 3 side and its light receiving unit 8b being positioned outside the winding reel 3. Also, an output terminal of the light receiving unit 8b is optically connected to a rotation speed detecting circuit 10 for detecting a rotation speed of the winding reel 3, and a calculating circuit 11 for calculating and outputting a clock signal F2 based on a rotation speed pulse signal F1 outputted from the rotation speed detecting circuit 10 is connected to the rotation speed detecting circuit 10.

In the mean time, a motor 21 is connected to a rotating shaft 3a of the winding reel 3 to drive the winding reel 3 into rotation and the driving force of the motor 21 is transmitted to a rotating shaft 5a of the feeding out reel 5 through a gear coupling mechanism 22. Also, on an upper stream side and a down stream side in the running direction of the tape 6 wound around the drum 2, a sensor 13a and a sensor 13b are disposed respectively at both ends of a previously set determined distance along the circumference of the tape 6.

Then, in the embodiment, an output terminal of an operating circuit 11, an output terminal of the sensor 13a as well as an output terminal of the sensor 13b are connected to an input terminal of a rotation control circuit 12 for controlling a rotating speed of the winding reel 2 and the feeding-out reel 5 in a way that the running speed of the tape 6 becomes a predetermined value and an output terminal of the rotation control circuit 12 is connected to the motor 21.

By the way, in the above-mentioned photo-sensor 8, because a light from the light emitting unit 8a is repeatedly received by the light receiving unit 8b with the rotation of the winding reel 3 at a predetermined interval, as is shown in FIG. 3, it can be represented by an equivalent circuit 8A in which a switch 23 repeats ON-OFF, a light emitting diode P repeats on and off. The rotation speed detecting circuit 10 which is optically connected to the equivalent circuit 8A, as shown in the FIG. 3, is such that a collector of a phototransistor 25 an emitter of which is grounded is connected to a connecting point between a resistor 27 and a capacitor 26 which are serially connected to each other between a power source Vcc and the ground, and the connecting point between the capacitor 26 and the resistor 27 is connected to a base of a transistor 30 an emitter of which is grounded through a resistor 28. Then, a resistor 29 is connected between a collector of the transistor 30 and a power source Vcc, a capacitor 31 is connected between the collector of the transistor 30 and the ground, and an output terminal of the rotation speed detecting circuit 10 is provided at a connecting point between the capacitor 31 and the transistor 30.

Also, in the above-mentioned calculating circuit 11 is, as shown in FIG. 1, provided a CPU 16 for controlling the whole operations, and to the CPU 16 are connected through a bus B an input circuit 15 which is connected to the rotation speed detecting circuit 10 and carries out an input interface operation as well as a ROM 17 storing a table in which are written an accumulating count value of the rotation speed pulse signal F1 from the rotation speed detecting circuit 10 and a counting value corresponding to the accumulating counting value at every second as well as a program for a clock calculating operation based on the table. Similarly, to the CPU 16 are connected through the bus B a nonvolatile RAM 18 in and from which various kinds of data are written in and read out at the time of the clock calculating operation as well as the rotation control circuit 12 and an output terminal 20 for carrying out an output interface operation is connected thereto.

Operations of the embodiment having such an arrangement will be explained.

First of all, the clock calculating operations according to the embodiment will be explained with reference to the flowchart in FIG. 4.

In the embodiment, corresponding to the rotation of the winding reel 3, a received light at the light receiving unit 8b from the light emitting unit 8a of the photo-sensor 8 is shielded by the photo-interrupter 7 at a predetermined interval corresponding to the rotation speed, and the rotation speed pulse signal F1 at a counting rate corresponding to the rotation speed of the winding reel 3 is outputted from the rotation speed detecting circuit 10 and the rotation speed pulse signal F1 is inputted to the input circuit 15 of the calculating circuit 11.

At step S1 in the flowchart of FIG. 4, an every second counting value (X) corresponding to the accumulating counting value of the rotation speed pulse signal inputted from the input circuit 15 is retrieved from the ROM 17 by the CPU 16. Then, and the process proceeds to step S2, whereat it is judged whether or not the winding reel 3 is rotating in a normal or forward direction.

When it is judged that the winding reel 3 is rotating in the normal direction at step S2, the process proceeds to step S3 and the rotation speed pulse signal F1 is added to a present accumulating counting value and counted by a command of the CPU 16, and the added and counted value is written in the RAM 18 until it becomes X and when it is judged at step S3 that the added and counted value becomes X, the process proceeds to step S4 and one second is incremented in terms of the second and the second of a present clock signal is designated. Similar adding and counting processes are continued and at step S4, a present clock signal F2 in terms of a minute unit and an hour unit exceeding the second is calculated.

In the meantime, when it is judged that the winding reel 3 is rotating in a reverse direction at step S2, the process proceeds to step S5 and a rotation speed pulse signal F1 is subtracted from a present accumulating counting value and counted by a command of the CPU 16 and the subtracted and counted value is written in the RAM 18 until the subtracted and counted value becomes −X, and when it is judged at step S5 that the subtracted and counted value reaches −X, the process proceeds to step S6, and one second is decremented in terms of the second and the second of the present clock signal is designated. Similar adding and counting process is continued and at step S6, a present clock signal F2 in terms of a minute unit and an hour unit exceeding the second is calculated.

The clock calculating operations explained up to now are executed in all of a recording mode, a reproducing mode, a fast forward mode and a rewinding mode of the recording and reproducing apparatus. Also, as the RAM 18 in and from which data is written and read out at the time of the clock calculating operations is formed to be nonvolatile, in a case where the tape cartridge housing 1 is removed from the recording and reproducing apparatus and is installed again for use or at a time of its use after a power failure is recovered, an operation is started from a previous state and the operation is continuously efficiently executed as data of the RAM 18 has not been erased.

Nextly, an explanation will be given about a controlling operation of a tape running speed according to the embodiment.

By the above-mentioned counting calculating operations, the clock signal F2 outputted from the operating circuit 11 is inputted to the rotation control circuit 12, and a passage of a reference position of the drum 2 around which the tape 6 is partially wound is detected by the sensors 13a and 13b disposed apart with a predetermined space along the circumference of the tape 6 and detecting signals F3a and F3b from the sensors 13a and 13b are inputted to the rotation control circuit 12.

In the present embodiment, the present running speed of the tape 6 is calculated by the rotation control circuit 12 based on the clock signal F2 outputted from the operating circuit 11, the detecting signal F3a from the sensor 13a and the detecting signal F3b from the sensor 13b, and the calculated running speed is compared with a speed prescribed by the presently set mode and the rotation control circuit 12 outputs a control signal Fc for controlling the rotation of the motor 21 of the winding reel 3 in a way that the running speed of the tape 6 becomes the prescribed running speed.

Then, the rotation number of the motor 21 is adjusted by the control signal Fc from the rotation control circuit 12 and the rotation of the motor 21 is transferred to the rotation shaft 5a of the feeding-out reel 5 through the gear coupling mechanism 22, and the rotation speed of the winding reel 3 and the rotation speed of the feeding-out reel 5 are controlled in a way that the running speed of the tape 6 becomes a prescribed running speed in the present mode.

As explained up to now, according to the embodiment, there is no need for a capstan motor which makes the whole apparatus large-sized and the rotation speed of the winding reel 3 is detected by the photo-interrupter 7 formed on the winding reel 3, the photo-sensor 8 and the rotation speed detecting circuit 10 as well, and based on the rotation speed, the clock signal F2 is calculated in the calculating unit 11 by the every second counting value corresponding to an accumulating counting value read out from the ROM 17, the running speed of the tape 6 is calculated from the detecting signals F3a and F3b of the sensors 13a and 13b by the rotation control circuit 12, and the rotation speed of the winding reel 3 and the feeding reel 5 is controlled by the control signal Fc outputted from the rotation control circuit 12 in a way that the running speed of the tape 6 becomes a prescribed value.

In this manner, according to the embodiment, there is no need for a capstan motor which impedes small-sizing of the apparatus, and as a result, the tape 6, the drum 2, the winding reel 3, the feeding-out reel 5 and the control driving system are accommodated in the tape cartridge housing 1 which is detachably loaded in the recording and reproducing apparatus, written data of the RAM 18 is not erased when the tape cartridge housing 1 is installed again or when a power failure is recovered, thereby making it possible to immediately start appropriate servo control, to set at a prescribed value in a short period of time as well as to always control the running speed of the tape 6 with a high precision by a small-sized and simple operation.

A second embodiment of the present invention will be explained with reference to FIG. 5.

Figure 5:
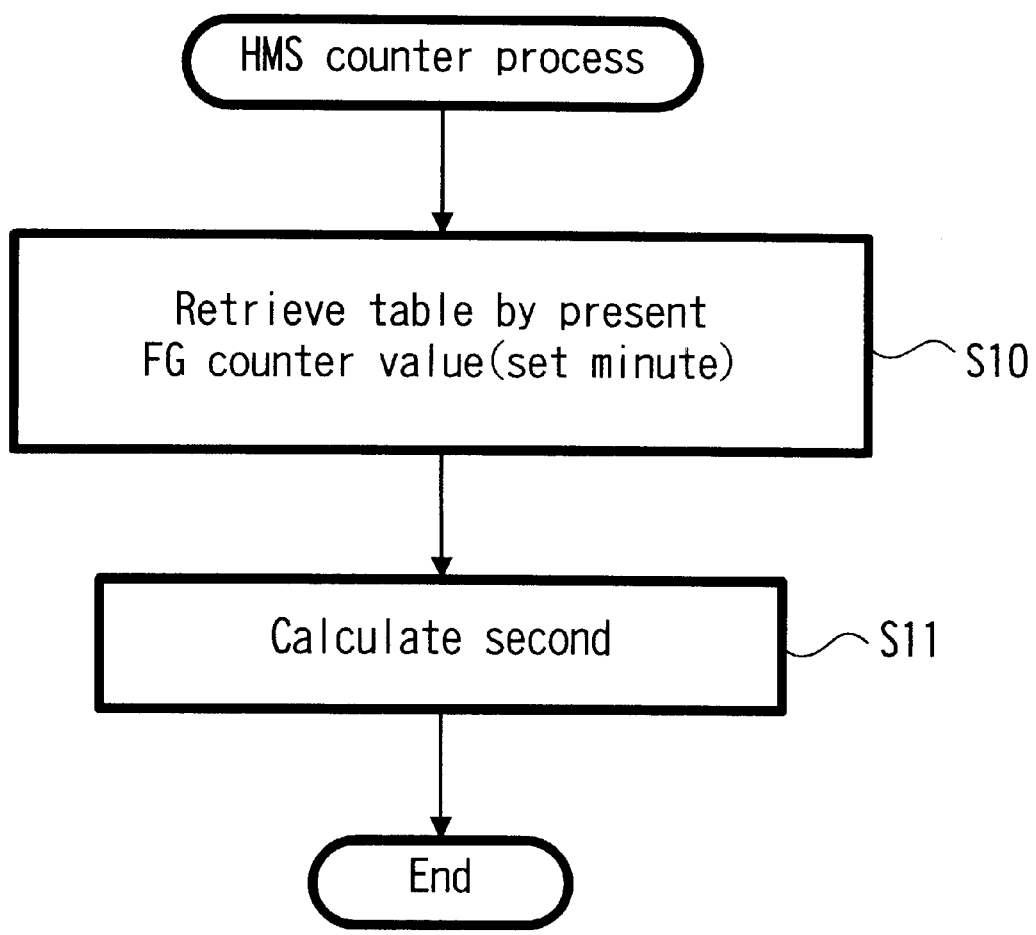
FIG. 5 is a flowchart showing a clock calculating operation of a second embodiment of the present invention.

FIG. 5 is a flowchart showing a clock operation of the embodiment.

In the embodiment, an explanation will be made by using FIG. 1 referred to in the first embodiment which was already explained. In the ROM 17 of the calculating circuit 11 are, different from the first embodiment, stored a table in which an accumulating counting value of the speed pulse signal F1 at every minute from one end of the tape 6 and a counting value at every second in a minute is written and a program for clock calculating operations.

As an arrangement of other portions in this embodiment is the same as that explained in FIG. 1, an overlapping explanation will not be made.

Clock calculating operations according to the second embodiment will be explained with reference to the flowchart in FIG. 5.

At step S10 in the flowchart of FIG. 5, if a minute's position between what minutes and what minutes is retrieved from the table of the ROM 17 based on the accumulating counting value of the present rotation speed pulse signal F1 by the CPU 16 of the calculating circuit 11 and a minute's position from the one end of the present tape 6 is specified, and the process proceeds to step S11 in which by dividing the remaining speed pulse signal from the specified minute's position by a counting value per one second, the counting signal F2 is easily calculated.

As control operation of a running speed of the tape 6 according the embodiment is the same as that explained in the first embodiment which was already explained, an overlapping explanation will not be made.

In this manner, according to the embodiment, in addition to the effects obtained in the first embodiment which was already explained, because the counting signal is easily calculated by the accumulating counting value read out from the ROM 17 in the operating terminal 11 of the speed pulse signal at every minute from one end of the tape 6 based on the rotation speed of the winding reel 3 as well as by a counting value at every second of a minute, it is possible to efficiently carry out the operation of the clock signal F2 as well as the control of a running speed of the tape 6 based on the obtained calculated value.

Meanwhile, in the embodiments explained up to now, a case where the photo-interrupter is installed on the winding reel has been explained, but the present embodiment is not limited to these embodiments and as a result, the photo-interrupter can be installed on the feeding-out reel.

A tape cartridge for use in a recording and reproducing apparatus according to the present invention comprises:

a housing incorporating therein a tape;

a tape, a drum, and first and second reels which are all incorporated in the housing;

a tape drive mechanism incorporated in the housing and feeding the tape;

a detecting means incorporated in the housing for detecting a rotation of the reel; and a converting means incorporated in the housing for converting a signal concerning a rotation detected by the detecting means into a signal concerning a rotation speed.

A recording and reproducing system formed of a tape cartridge and a recording apparatus according to the present invention comprises a cartridge formed being formed of;

a housing incorporating therein a tape, a tape, a drum, and first and second reels which are all incorporated in the housing, a tape drive mechanism incorporated in the housing and feeding the tape, a detecting means incorporated in the housing for detecting a rotation of the reel, and a converting means incorporated in the housing for converting a signal concerning a rotation detected by the detecting means into a signal concerning a rotation speed; and a recording and reproducing apparatus using the tape cartridge being formed of;

a tape cartridge accommodation portion for accommodating therein the tape cartridge, a means for electrically connecting to the converting means and the tape drive mechanism in the tape cartridge, a calculation circuit for receiving and accumulating a pulse signal concerning the rotation speed and generating a control pulse signal corresponding to an accumulation counting value, the control pulse signal indicating a pulse number at every second, and an output circuit for outputting the control pulse signal to the tape drive mechanism.

Therefore, the rotation speed of the reel is controlled in a way that the calculated running speed of the tape becomes the previously set determined value, the winding and rewinding of the built-in recording and reproducing tape can be carried out by the rotation of the reel at a previously set determined stable running speed, and as the tape, the drum, reels, the tape drive mechanism, the detecting means, and the converting means are all accommodated in the tape cartridge housing, it is possible to carry out high precision control of the running speed of the tape and as a result, a wholly substantially light and small-sized tape cartridge of a recording and reproducing apparatus can be proposed.

Further, according to the present invention, since the clock signal is calculated based on the accumulated counting value of the speed pulse signal read out from the memory and the every second counting value corresponding to the accumulating counting value, it becomes possible to carry out the control of up to the predetermined running speed of the tape stably and in a short period of time.

According to the present invention, the clock signal is calculated based on the accumulating counting value of an every minute speed pulse signal and an every second of a minute counting value, so that, it becomes possible to carry out the control of up to the predetermined running speed of the tape stably and in a short period of time.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A tape cartridge for use in a recording and reproducing apparatus, comprising:

a housing incorporating a tape;

a tape, a drum, and first and second reels all incorporated in the housing, the tape extending between the reels and wound about the drum;

a tape drive mechanism incorporated in the housing for feeding the tape between the reels;

a detecting means incorporated in the housing for detecting the rotation of the reels and generating a rotation detection signal; and a converting means incorporated in the housing for converting said rotation detection signal into a speed signal.

2. A tape cartridge as claimed in claim 1, wherein the tape drive mechanism is comprised of a motor for rotatably driving at least one of the reels, and the detecting means is comprised of a photo-sensor for detecting a rotation of a photo-interrupter coupled to the one reel.

3. A tape cartridge as claimed in claim 2, further comprising a control circuit for controlling a rotation of the motor incorporated in the housing.

4. A recording and reproducing system formed of a tape cartridge and a recording apparatus, comprising;

a cartridge formed of a housing;

a tape, a drum, and first and second reels all incorporated in the housing, the tape extending between the reels and wound about the drum;

a tape drive mechanism incorporated in the housing feeding the tape between the reels;

a detector incorporated in the housing for detecting a rotation of at least one of the reels, and generating a rotation detection signal, and a converter incorporated in the housing for converting said rotation detection signal into a speed signal; and a recording and reproducing apparatus operable with the tape cartridge and formed of:

a tape cartridge accommodation portion for accommodating therein the tape cartridge, a calculation circuit for receiving and accumulating a pulse signal representing the rotation speed of said one reel and generating a control pulse signal corresponding to an accumulated count of said pulse signal and indicating a pulse number at every unit of time, and an output circuit for outputting the control pulse signal to the tape drive mechanism for controlling the movement of said tape between said reels.

5. The recording and reproducing system of claim 4, wherein the calculation circuit is comprised of a ROM for storing a conversion table for an accumulated count and a pulse number at every unit of time.

6. The recording and reproducing system of claim 5, wherein the ROM stores an accumulated count that is accumulated from a tape end at predetermined time intervals and a calculated value at every second within a predetermined time interval.

7. The recording and reproducing system of claim 4, wherein the tape cartridge further comprises a rotation control circuit responsive to said control pulse signal to control the tape drive mechanism.

8. The recording and reproducing system as claimed in claim 6, wherein the calculation circuit is incorporated in the tape cartridge and further includes a CPU connected to a nonvolatile RAM.

9. A tape cartridge for use in a recording and reproducing apparatus, comprising:

a housing;

a tape, a drum, and first and second reels all incorporated in the housing, the tape extending between the reels and wound about the drum;

a tape drive mechanism incorporated in the housing for feeding the tape between the reels;

a detector incorporated in the housing for detecting a rotation of at least one of the reels and generating a rotation detection signal and;

a converter incorporated in the housing for converting said rotation detection signal into a speed signal.

10. The tape cartridge of claim 9, wherein the tape drive mechanism is comprised of a motor for rotatably driving at least one of the reels, and the detector is comprised of a photo-sensor for detecting a rotation of a photo-interrupter coupled to said one reel.

11. The tape cartridge of claim 10, further comprising a control circuit incorporated in the housing for controlling the rotation of aid motor.

* * * * *